(12) United States Patent
Rydwell

(10) Patent No.: US 11,318,394 B2
(45) Date of Patent: May 3, 2022

(54) SUSPENSION SYSTEM FOR RADIO-CONTROLLED VEHICLES

(71) Applicant: Michael Rydwell, Irvine, CA (US)

(72) Inventor: Michael Rydwell, Irvine, CA (US)

( * ) Notice: Subject to any disclaimer, the term of this patent is extended or adjusted under 35 U.S.C. 154(b) by 290 days.

(21) Appl. No.: 16/814,850

(22) Filed: Mar. 10, 2020

(65) Prior Publication Data

US 2021/0283517 A1 Sep. 16, 2021

(51) Int. Cl.
*A63H 17/26* (2006.01)
*B62D 21/11* (2006.01)

(52) U.S. Cl.
CPC ....... *A63H 17/262* (2013.01); *B60G 2300/20* (2013.01); *B62D 21/11* (2013.01)

(58) Field of Classification Search
CPC .. A63H 17/262; A63H 30/04; B60G 2300/20; B62D 21/11
USPC .......................... 446/454, 465, 466, 468, 470
See application file for complete search history.

(56) References Cited

U.S. PATENT DOCUMENTS

| | | | | |
|---|---|---|---|---|
| 4,159,126 A * | 6/1979 | Raleigh | ................... | B60G 11/00 446/466 |
| 5,120,254 A * | 6/1992 | Daniels | ................. | A63H 17/262 446/469 |
| 5,527,059 A * | 6/1996 | Lee, Jr. | ................. | B60G 17/016 280/43.23 |
| 5,577,571 A * | 11/1996 | Rizzoli | ................... | B60G 7/001 180/291 |
| 6,641,457 B1 * | 11/2003 | Lai | ........................ | A63H 17/262 446/454 |
| 6,881,122 B2 * | 4/2005 | Bloch | .................... | A63H 29/22 446/457 |
| 6,945,843 B1 * | 9/2005 | Motosko | .............. | A63H 17/262 446/457 |
| 7,335,084 B2 * | 2/2008 | Sato | ...................... | A63H 17/262 446/469 |
| 7,717,221 B2 * | 5/2010 | Anderson | ............ | A63H 17/262 180/335 |
| 7,735,867 B2 * | 6/2010 | Byers | ................... | A63H 17/262 248/62 |
| 7,793,951 B2 * | 9/2010 | Byers | ................... | B60G 15/067 280/774 |
| 7,810,604 B2 * | 10/2010 | Byers | ................... | B60G 15/067 180/385 |
| 7,883,099 B2 * | 2/2011 | Byers | ................... | B60G 15/067 280/124.135 |

(Continued)

FOREIGN PATENT DOCUMENTS

EP 1982570 A1 12/2010

*Primary Examiner* — Alexander R Niconovich

(57) ABSTRACT

A suspension system for radio-controlled vehicles improves stability and traction. The suspension system includes a chassis, a motor pod plate, a shock absorption system, an upper pitch suspension link, a lower pitch suspension link, a left yaw suspension link, and a right yaw suspension link. The shock absorption system is used to reduce vibrations caused by impacts onto a radio-controlled vehicle. The upper pitch suspension link and the lower pitch suspension link allow the motor pod plate to pivot back and forth about a pitch axis of the chassis in order to increase stability and traction. The left yaw suspension link and the right yaw suspension link allow the motor pod plate to pivot back and forth about a yaw axis of the chassis in order to further increase stability and traction.

14 Claims, 5 Drawing Sheets

(56) References Cited

U.S. PATENT DOCUMENTS

| | | | | |
|---|---|---|---|---|
| 7,934,579 B2* | 5/2011 | Bowers | ................ | B60G 15/062 |
| | | | | 180/352 |
| 7,997,598 B2* | 8/2011 | Ralph | .................... | B60G 7/001 |
| | | | | 280/124.148 |
| 8,052,345 B2* | 11/2011 | Byers | .................. | B60G 15/067 |
| | | | | 403/135 |
| 8,079,892 B2* | 12/2011 | Wang | ................... | A63H 33/005 |
| | | | | 446/469 |
| 10,413,838 B2* | 9/2019 | Chu | .................... | A63H 17/264 |
| 11,241,636 B2* | 2/2022 | Vetuskey | ............. | A63H 17/262 |
| 2002/0077025 A1* | 6/2002 | Wu | ...................... | A63H 17/262 |
| | | | | 446/469 |
| 2005/0156399 A1* | 7/2005 | Chu | ........................ | B60G 3/20 |
| | | | | 280/124.134 |
| 2006/0260860 A1* | 11/2006 | Byers | ...................... | B60K 1/00 |
| | | | | 180/291 |
| 2015/0184714 A1* | 7/2015 | Miller | .................... | F16F 9/145 |
| | | | | 188/290 |
| 2018/0126290 A1* | 5/2018 | Hodge | ................ | A63H 17/262 |
| 2020/0269643 A1* | 8/2020 | Tsai | .................. | B60G 17/0152 |

* cited by examiner

SUSPENSION SYSTEM FOR RADIO-CONTROLLED VEHICLES

FIELD OF THE INVENTION

The present invention relates generally to radio-controlled vehicles. More specifically, the present invention is a suspension system for radio-controlled vehicles that improves stability and traction.

BACKGROUND OF THE INVENTION

Radio-controlled vehicles can be used for recreation or competition. In the competitive scene, radio-controlled vehicles are raced against each other. In more detail, radio-controlled vehicles are remotely controlled to traverse a track which may contain multiple sharp turns and obstacles. In order to maneuver through or about these sharp turns and obstacles, a radio-controlled vehicle requires good stability and traction. The suspension system of a radio-controlled vehicle establishes where the stability and traction are good or not. Standard/conventional suspension systems of radio-controlled vehicles include arrangements that allow the radio-controlled vehicle to pivot in the left and right directions in order make turns. More specifically, the suspension system allows the radio-controlled vehicle to pivot in the left and right directions at a centerline of a chassis. This arrangement does not provide the optimal stability and traction for radio-controlled vehicles. There exists a need for a better suspension system for radio-controlled vehicles.

It is therefore an objective of the present invention to provide a suspension system for radio-controlled vehicles that improves stability and traction. The present invention includes a specific arrangement which allows a motor pod plate of a radio-controlled vehicle to pivot forwards, backwards, in the left direction, and in the right direction without a center pivot that forces the motor pod plate to pivot at a centerline of the chassis of a radio-controlled vehicle. Thus, the present invention increases stability and traction for a radio-controlled vehicle.

DETAIL DESCRIPTIONS OF THE INVENTION

Figure 1:
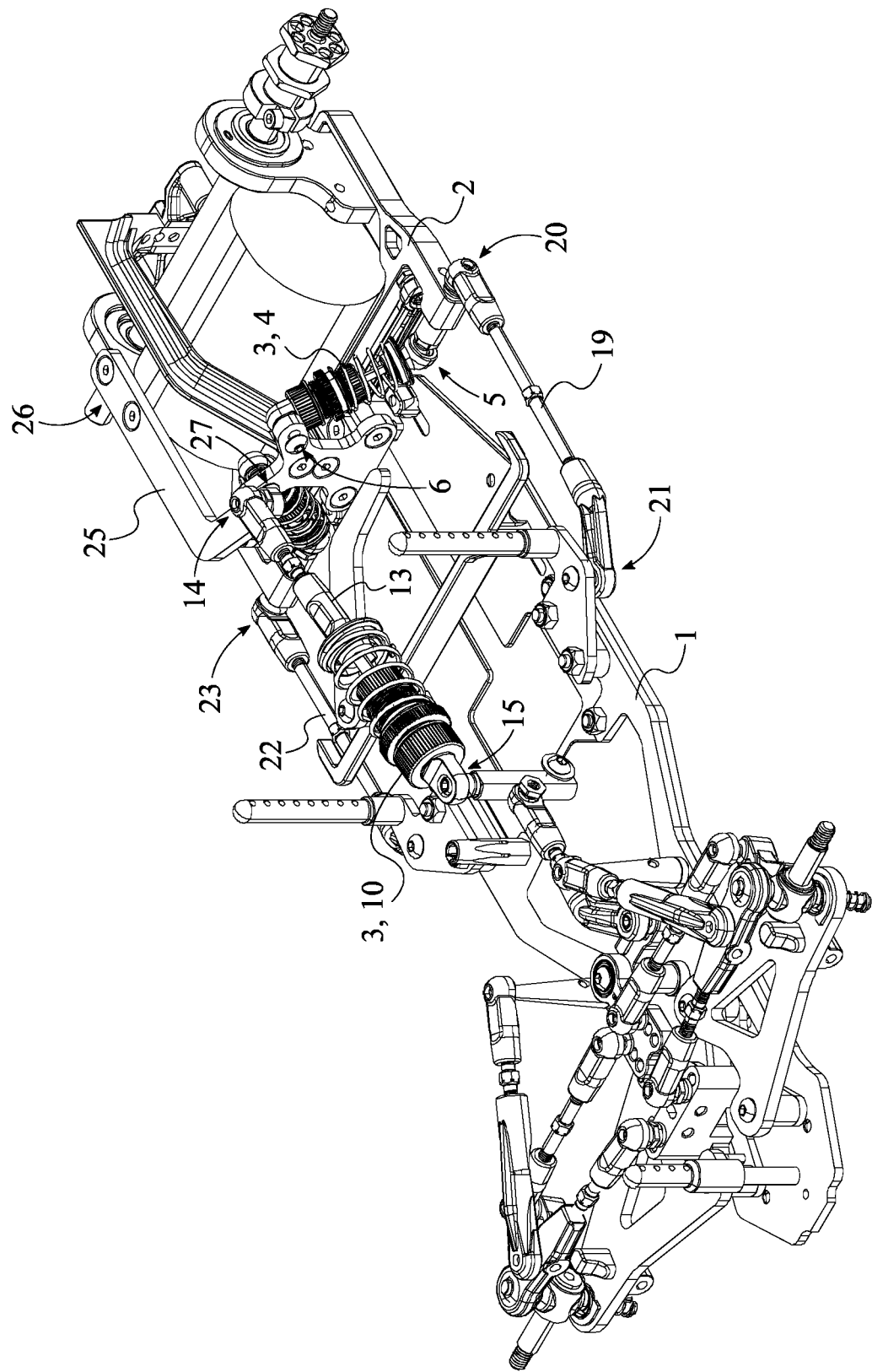
FIG. 1 is a top-left-front perspective view of the present invention.

All illustrations of the drawings are for the purpose of describing selected versions of the present invention and are not intended to limit the scope of the present invention.

In reference to FIGS. 1 through 5, the present invention is a suspension system for radio-controlled vehicles that improves stability and traction. The present invention comprises a chassis 1, a motor pod plate 2, a shock absorption system 3, an upper pitch suspension link 13, a lower pitch suspension link 16, a left yaw suspension link 19, and a right yaw suspension link 22. The chassis 1 and the motor pod plate 2 are structural frame portions of a radio-controlled vehicle's assembly. The shock absorption system 3 is used to reduce vibrations caused by impacts onto a radio-controlled vehicle. The upper pitch suspension link 13 and the lower pitch suspension link 16 allow the motor pod plate 2 to pivot back and forth about a pitch axis of the chassis 1 in order to increase stability and traction. The left yaw suspension link 19 and the right yaw suspension link 22 allow the motor pod plate 2 to pivot back and forth about a yaw axis of the chassis 1 in order to further increase stability and traction.

Figure 2:
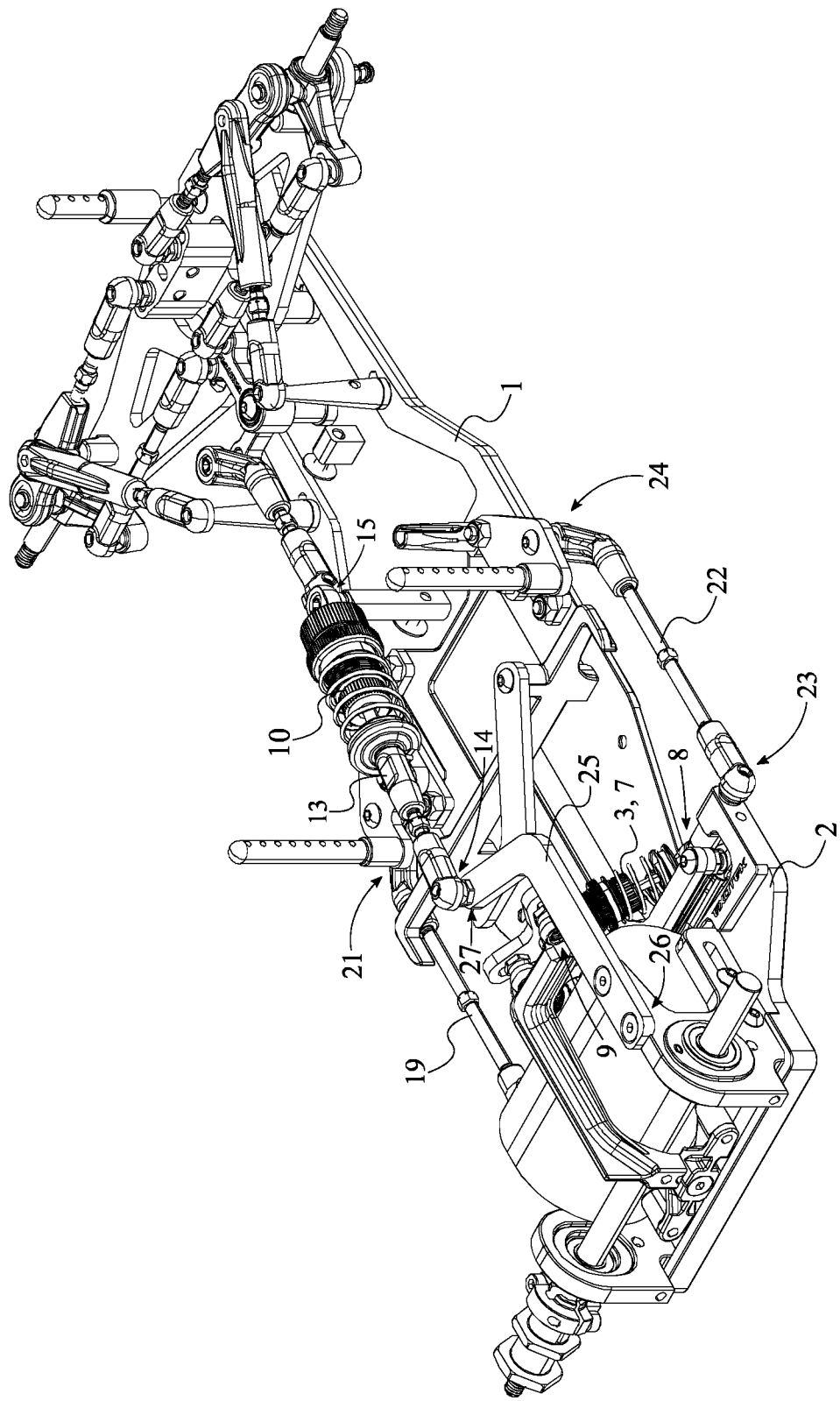
FIG. 2 is a top-right-rear perspective view of the present invention.
Figure 3:
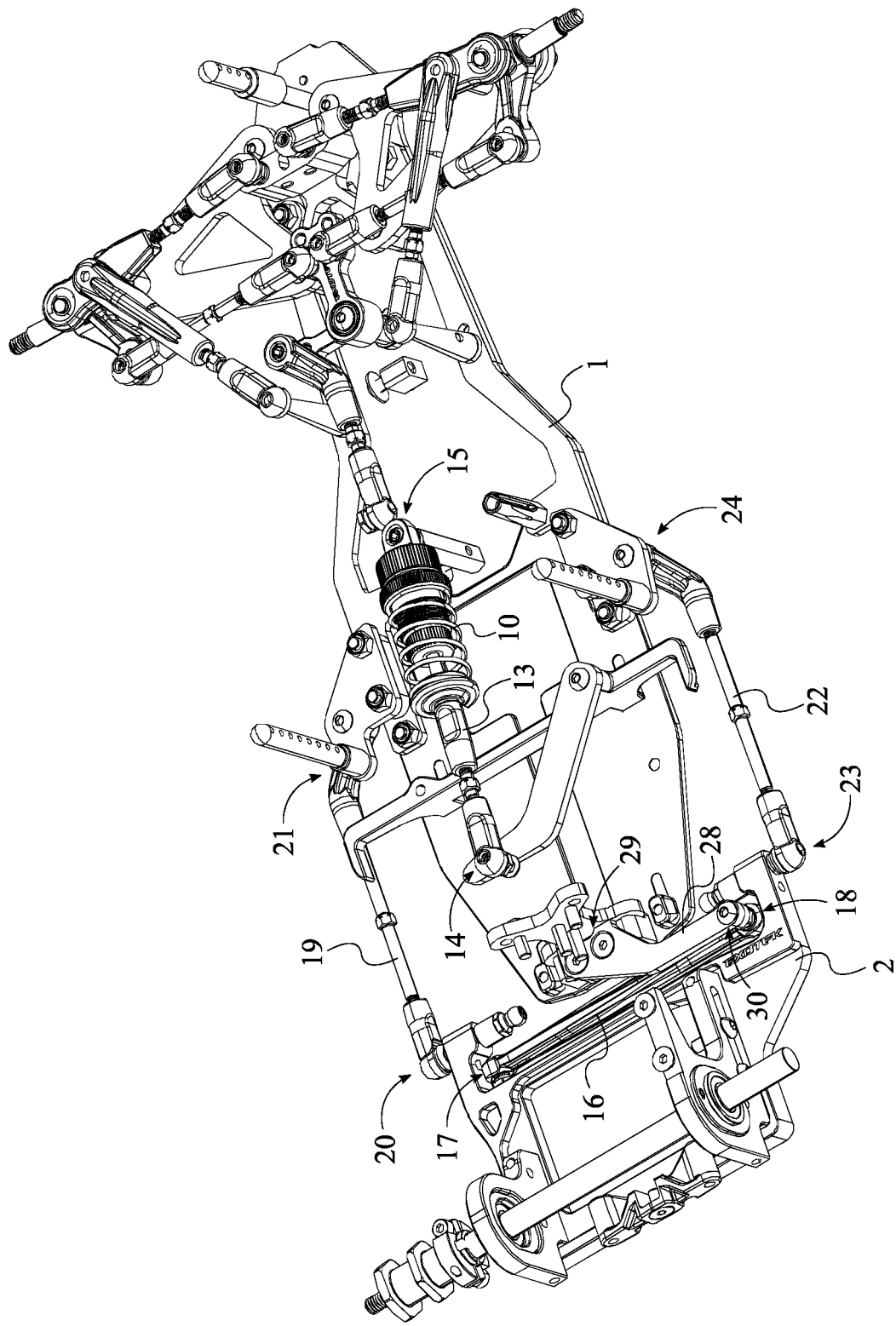
FIG. 3 is a top-right-rear perspective view of the present invention without the left shock absorber, the right shock absorber, and the upper extension arm.

The general configuration of the aforementioned components provides a suspension system for a radio-controlled vehicle for increased stability and traction. With reference to FIGS. 1 through 3, the motor pod plate 2 is positioned offset from the chassis 1, and the motor pod plate 2 is mounted offset to the chassis 1 by the upper pitch suspension link 13, the lower pitch suspension link 16, the left suspension link, and the right yaw suspension link 22. This arrangement allows the motor pod plate 2 to pivot forwards and backwards with respect to the chassis 1, and to pivot in the left and right directions with respect to the chassis 1. In order for pivot symmetry to be established, the motor pod plate 2 and the chassis 1 are positioned in between the left yaw suspension link 19 and the right yaw suspension link 22. The upper pitch suspension link 13 is positioned offset from the motor pod plate 2, and the lower pitch suspension link 16 is positioned adjacent to the motor pod plate 2. This arrangement prevents the motor pod plate 2 from pivoting in the left and right directions at a centerline of the chassis 1. The shock absorption system 3 is operatively mounted amongst the upper pitch suspension link 13, the left yaw suspension link 19, and the right yaw suspension link 22 in order for the shock absorption system 3 to reduce vibrations amongst the upper pitch suspension link 13, the left yaw suspension link 19, and the right yaw suspension link 22. In further detail, the shock absorption system 3 is used to reduce vibrations caused during turns made by a radio-controlled vehicle and vibrations causes by the radio-controlled vehicle encountering uneven ground surfaces or other kinds of impacts.

Figure 5:
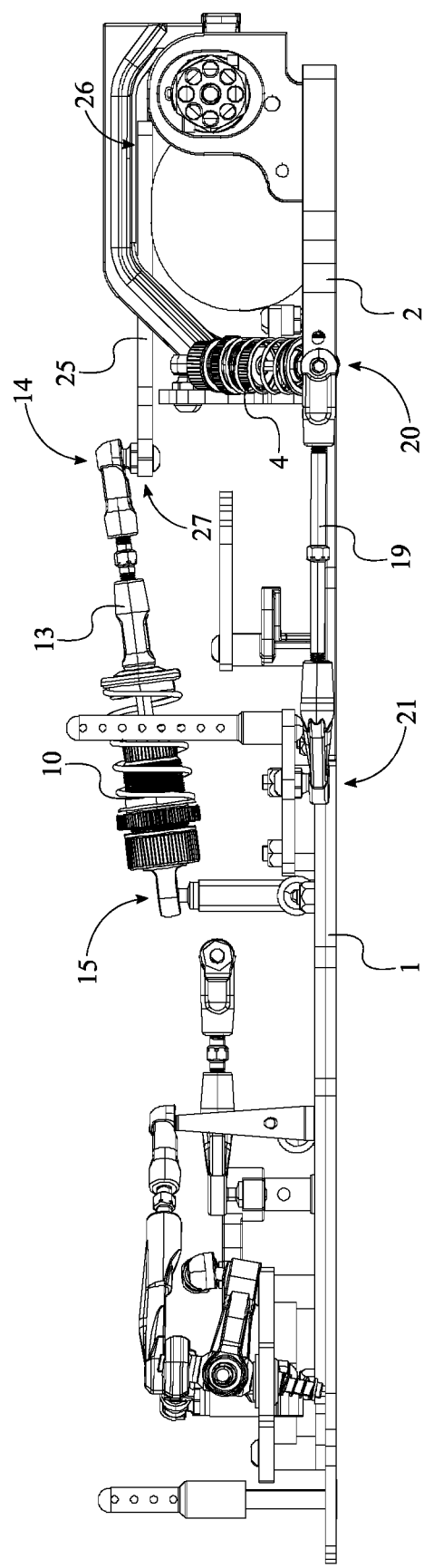
FIG. 5 is a left-side view of the present invention.

With reference to FIGS. 1 and 5, the shock absorption system 3 may comprise a left shock absorber 4 in order to specifically reduce vibrations that occur when the motor pod plate 2 pivots in the left direction or when the radio-controlled vehicle is impacted at its left side. The left shock absorber 4 comprises a first left absorber end 5 and a second left absorber end 6. The left yaw suspension link 19 comprises a first left link end 20 and a second left link end 21. The first left absorber end 5 is pivotably mounted to the motor pod plate 2, and the second left absorber end 6 is pivotably mounted to chassis 1, offset from the chassis 1. This arrangement provides the left shock absorber with necessary space to operate in between the chassis 1 and the motor pod plate 2. The first left link end 20 is pivotably mounted to the motor pod plate 2, adjacent to the first left absorber end 5 in order for the left shock absorber 4 to immediately dampen any vibrations felt by the motor pod plate. The second left link end 21 is pivotably mounted to the chassis 1, offset from the motor pod plate 2. This arrangement allows the left yaw suspension link 19 to connect the motor pod plate 2 to a more stable portion of the chassis 1. All of the aforementioned pivotable mountings amongst the left shock absorber 4 and the left yaw suspension link 19 are preferably ball-and-socket joints.

Figure 4:
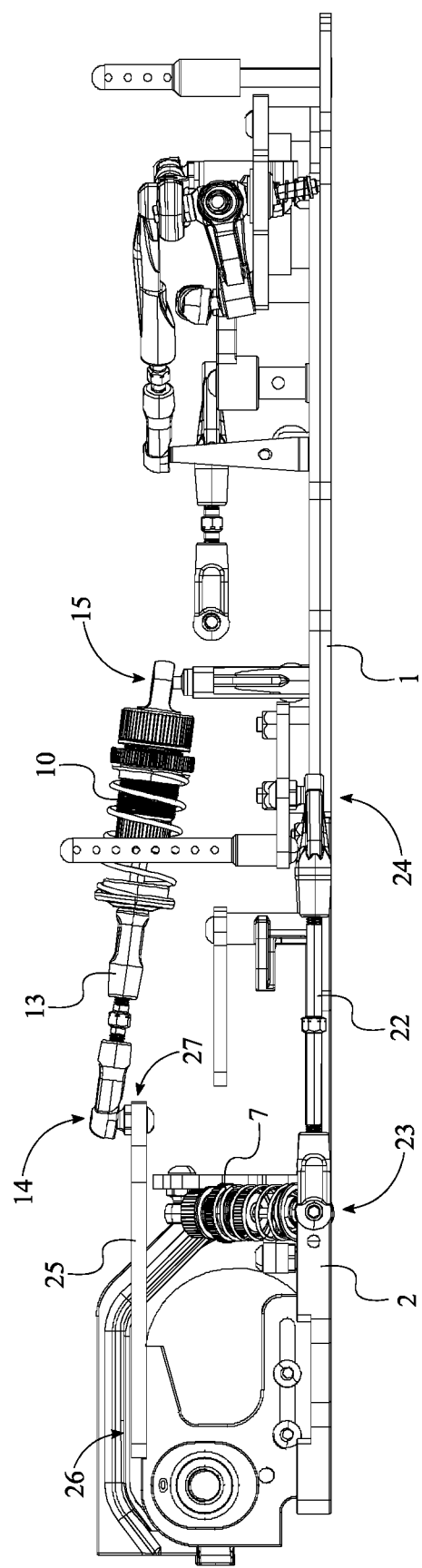
FIG. 4 is a right-side view of the present invention.

Similarly and with reference to FIGS. 2 and 4, the shock absorption system 3 may further comprise a right shock absorber 7 in order to specifically reduce vibrations that occur when the motor pod plate 2 pivots in the right direction or when the radio-controlled vehicle is impacted at its right side. The right shock absorber 7 comprises a first right absorber end 8 and a second right absorber end 9. The right yaw suspension link 22 comprises a first right link end 23 and a second right link end 24. The first right absorber end 8 is pivotably mounted to the motor pod plate 2, and the second right absorber end 9 is pivotably mounted to chassis 1, offset from the chassis 1. This arrangement allows the right shock absorber 7 to effectively reduce vibrations when the motor pod plate 2 pivots in the right direction. The first right link end 23 is pivotably mounted to the motor pod plate 2, adjacent to the first right absorber end 8 in order for the right shock absorber 7 to immediately dampen vibrations felt by the motor pod plate 2. The second right link end 24 is pivotably mounted to the chassis 1, offset from the motor pod plate 2. This arrangement allows the right yaw suspension link 22 to connect the motor pod plate 2 to a more stable portion of the chassis 1. All of the aforementioned pivotable mountings amongst the right shock absorber 7 and the right yaw suspension link 22 are preferably ball-and-socket joints.

With reference to FIGS. 4 and 5, the shock absorption system 3 may further comprise an upper shock absorber 10 in order to specifically reduce vibrations that occur when the motor pod plate 2 pivots forwards or backwards. The upper pitch suspension link 13 comprises a first upper link end 14 and a second upper link end 15. The first upper link end 14 is pivotably mounted to the motor pod plate 2, adjacent to the motor pod plate 2 and the second upper link end 15 is pivotably mounted to the chassis 1, offset from the motor pod plate 2. This arrangement allows the upper pitch suspension link 13 to connect from the motor pod plate 2 to a more stable portion of the chassis 1. Further, the upper shock absorber 10 is integrated along the upper pitch suspension link 13. This arrangement allows the upper shock absorber 10 to reduce vibrations felt in between the motor pod plate 2 and the chassis 1.

With reference to FIGS. 1, 4, and 5, the present invention may further comprise an upper extension arm 25 in order to establish the pivot connection between the upper pitch suspension link 13 and the motor pod plate 2. The upper extension arm 25 comprises an upper fixed end 26 and an upper free end 27. The upper fixed end 26 is mounted adjacent to the motor pod plate 2, and the upper free end 27 is positioned adjacent to the chassis 1. This arrangement allows the upper extension arm 25 to act as a cantilever extending over the chassis 1 to structurally support the upper pitch suspension link 13. Further, the first upper link end 14 is pivotably mounted to the upper free end 27. Thus, the upper pitch suspension link 13 is pivotably mounted to the motor pod plate 2 through the upper extension arm 25. All of the aforementioned pivotable mountings amongst the upper shock absorber 10 and the upper pitch suspension link 13 are preferably ball-and-socket joints.

With reference to FIG. 3, the lower pitch suspension link 16 comprises a first lower link end 17 and a second lower link end 18 in order to establish the lower pitch pivot connection between the motor pod plate 2 and the chassis 1. The lower pitch suspension link 16 is positioned in between the motor pod plate 2 and the chassis 1. This arrangement positions the lower pitch suspension link 16 in order establish the connection, at a lower point, between the chassis 1 and the motor pod plate 2. The first lower link end 17 is pivotably mounted to the chassis 1, adjacent to the left yaw suspension link 19, and the second lower link end 18 is pivotably mounted to the motor pod plate 2, adjacent to the right yaw suspension link 22. This arrangement allows the lower pitch suspension link 16 to be efficiently space in between the chassis 1 and the motor pod plate 2.

With reference to FIG. 3, the present invention may further comprise a lower extension arm 28 in order to establish the pivot connection between the lower pitch suspension link 16 and the chassis 1. The lower extension arm 28 comprises a lower fixed end 29 and a lower free end 30. The lower fixed end 29 is mounted adjacent to the chassis 1, and the lower free end 30 is positioned in between the motor pod plate 2 and the chassis 1. This arrangement allows the lower extension arm 28 to act as a cantilever extending over the chassis 1 to structurally support the lower pitch suspension link 16. Further, the first lower link end 17 is pivotably mounted to the lower free end 30 through the lower extension arm 28. This arrangement allows the lower extension arm 28 and the lower pitch suspension link 16 to act as a scissor mechanism that stabilizes the motor pod plate 2. All of the aforementioned pivotable mountings amongst the lower extension arm 28 and the lower pitch suspension link 16 are preferably ball-and-socket joints.

Although the invention has been explained in relation to its preferred embodiment, it is to be understood that many other possible modifications and variations can be made without departing from the spirit and scope of the invention as hereinafter claimed.

What is claimed is:

1. A suspension system for radio control vehicles comprises:
   a chassis;
   a motor pod plate;
   a shock absorbing system;
   an upper pitch suspension link;
   a lower pitch suspension link;
   a left yaw suspension link;
   a right yaw suspension link;
   the motor pod plate being positioned offset from the chassis;
   the motor pod plate being mounted offset to the chassis by the upper pitch suspension link, the lower pitch suspension link, the left yaw suspension link, and the right yaw suspension link;
   the motor pod plate and the chassis being positioned in between the left yaw suspension link and the right yaw suspension link;
   the upper pitch suspension link being positioned offset from the motor pod plate;
   the lower pitch suspension link being positioned adjacent to the motor pod plate; and
   the shock absorbing system being operatively mounted amongst the upper pitch suspension link, the left yaw suspension link, and the right yaw suspension link, wherein the shock absorbing system is used to reduce vibrations amongst the upper pitch suspension link, the left yaw suspension link, and the right yaw suspension link.

2. The suspension system for radio control vehicles as claimed in claim 1 comprises:
   the shock absorption system comprises a left shock absorber;
   the left shock absorber comprises a first left absorber end and a second left absorber end;
   the left yaw suspension link comprises a first left link end and a second left link end;
   the first left absorber end being pivotably mounted to the motor pod plate, adjacent to the motor pod plate;
   the second left absorber end being pivotably mounted to the chassis, offset from the chassis;
   the first left link end being pivotably mounted to the motor pod plate, adjacent to the first left absorber end; and the second left link end being pivotably mounted to the chassis, offset from the motor pod plate.

3. The suspension system for radio control vehicles as claimed in claim 1 comprises:
the shock absorption system comprises a right shock absorber;
the right shock absorber comprises a first right absorber end and a second right absorber end;
the right yaw suspension link comprises a first right link end and a second right link end;
the first right absorber end being pivotably mounted to the motor pod plate, adjacent to the motor pod plate;
the second right absorber end being pivotably mounted to the chassis, offset from the chassis;
the first right link end being pivotably mounted to the motor pod plate, adjacent to the first right absorber end; and
the second right link end being pivotably mounted to the chassis, offset from the motor pod plate.

4. The suspension system for radio control vehicles as claimed in claim 1 comprises:
the shock absorption system comprises an upper shock absorber;
the upper pitch suspension link comprises a first upper link end and a second upper link end;
the first upper link end being pivotably mounted to the motor pod plate, adjacent to the motor pod plate;
the second upper link end being pivotably mounted to the chassis, offset from the motor pod plate; and
the upper shock absorber being integrated along the upper pitch suspension link.

5. The suspension system for radio control vehicles as claimed in claim 4 comprises:
an upper extension arm;
the upper extension arm comprises an upper fixed end and an upper free end;
the upper fixed end being mounted adjacent to the motor pod plate;
the upper free end being positioned adjacent to the chassis; and
the first upper link end being pivotably mounted to the upper free end.

6. The suspension system for radio control vehicles as claimed in claim 1 comprises:
the lower pitch suspension link comprises a first lower link end and a second lower link end;
the lower pitch suspension link being positioned in between the motor pod plate and the chassis;
the first lower link end being pivotably mounted to the chassis, adjacent to the left yaw suspension link; and
the second lower link end being pivotably mounted to the motor pod plate, adjacent to the right yaw suspension link.

7. The suspension system for radio control vehicles as claimed in claim 6 comprises:
a lower extension arm;
the lower extension arm comprises a lower fixed end and a lower free end;
the lower fixed end being mounted adjacent to the chassis;
the lower free end is positioned in between the motor pod plate and the chassis; and
the first lower link end being pivotably mounted to the lower free end.

8. A suspension system for radio control vehicles comprises:
a chassis;
a motor pod plate;
a shock absorbing system;
an upper pitch suspension link;
a lower pitch suspension link;
a left yaw suspension link;
a right yaw suspension link;
the shock absorption system comprises a left shock absorber, a right shock absorber, and an upper shock absorber;
the left shock absorber comprises a first left absorber end and a second left absorber end;
the left yaw suspension link comprises a first left link end and a second left link end;
the right shock absorber comprises a first right absorber end and a second right absorber end;
the right yaw suspension link comprises a first right link end and a second right link end;
the upper pitch suspension link comprises a first upper link end and a second upper link end;
the motor pod plate being positioned offset from the chassis;
the motor pod plate being mounted offset to the chassis by the upper pitch suspension link, the lower pitch suspension link, the left yaw suspension link, and the right yaw suspension link;
the motor pod plate and the chassis being positioned in between the left yaw suspension link and the right yaw suspension link;
the upper pitch suspension link being positioned offset from the motor pod plate;
the lower pitch suspension link being positioned adjacent to the motor pod plate;
the shock absorbing system being operatively mounted amongst the upper pitch suspension link, the left yaw suspension link, and the right yaw suspension link, wherein the shock absorbing system is used to reduce vibrations amongst the upper pitch suspension link, the left yaw suspension link, and the right yaw suspension link;
the first left absorber end being pivotably mounted to the motor pod plate, adjacent to the motor pod plate;
the second left absorber end being pivotably mounted to the chassis, offset from the chassis;
the first left link end being pivotably mounted to the motor pod plate, adjacent to the first left absorber end;
the second left link end being pivotably mounted to the chassis, offset from the motor pod plate;
the first right absorber end being pivotably mounted to the motor pod plate, adjacent to the motor pod plate;
the second right absorber end being pivotably mounted to the chassis, offset from the chassis;
the first right link end being pivotably mounted to the motor pod plate, adjacent to the first right absorber end;
the second right link end being pivotably mounted to the chassis, offset from the motor pod plate;
the first upper link end being pivotably mounted to the motor pod plate, adjacent to the motor pod plate;
the second upper link end being pivotably mounted to the chassis, offset from the motor pod plate; and
the upper shock absorber being integrated along the upper pitch suspension link.

9. The suspension system for radio control vehicles as claimed in claim 8 comprises:
an upper extension arm;
the upper extension arm comprises an upper fixed end and an upper free end;
the upper fixed end being mounted adjacent to the motor pod plate;

the upper free end being positioned adjacent to the chassis; and the first upper link end being pivotably mounted to the upper free end.

10. The suspension system for radio control vehicles as claimed in claim 8 comprises:

the lower pitch suspension link comprises a first lower link end and a second lower link end;

the lower pitch suspension link being positioned in between the motor pod plate and the chassis;

the first lower link end being pivotably mounted to the chassis, adjacent to the left yaw suspension link; and the second lower link end being pivotably mounted to the motor pod plate, adjacent to the right yaw suspension link.

11. The suspension system for radio control vehicles as claimed in claim 10 comprises:

a lower extension arm;

the lower extension arm comprises a lower fixed end and a lower free end;

the lower fixed end being mounted adjacent to the chassis;

the lower free end is positioned in between the motor pod plate and the chassis; and the first lower link end being pivotably mounted to the lower free end.

12. A suspension system for radio control vehicles comprises:

a chassis;

a motor pod plate;

a shock absorbing system;

an upper pitch suspension link;

a lower pitch suspension link;

a left yaw suspension link;

a right yaw suspension link;

the shock absorption system comprises a left shock absorber, a right shock absorber, and an upper shock absorber;

the left shock absorber comprises a first left absorber end and a second left absorber end;

the left yaw suspension link comprises a first left link end and a second left link end;

the right shock absorber comprises a first right absorber end and a second right absorber end;

the right yaw suspension link comprises a first right link end and a second right link end;

the upper pitch suspension link comprises a first upper link end and a second upper link end;

the lower pitch suspension link comprises a first lower link end and a second lower link end;

the motor pod plate being positioned offset from the chassis;

the motor pod plate being mounted offset to the chassis by the upper pitch suspension link, the lower pitch suspension link, the left yaw suspension link, and the right yaw suspension link;

the motor pod plate and the chassis being positioned in between the left yaw suspension link and the right yaw suspension link;

the upper pitch suspension link being positioned offset from the motor pod plate;

the lower pitch suspension link being positioned adjacent to the motor pod plate;

the shock absorbing system being operatively mounted amongst the upper pitch suspension link, the left yaw suspension link, and the right yaw suspension link, wherein the shock absorbing system is used to reduce vibrations amongst the upper pitch suspension link, the left yaw suspension link, and the right yaw suspension link;

the first left absorber end being pivotably mounted to the motor pod plate, adjacent to the motor pod plate;

the second left absorber end being pivotably mounted to the chassis, offset from the chassis;

the first left link end being pivotably mounted to the motor pod plate, adjacent to the first left absorber end;

the second left link end being pivotably mounted to the chassis, offset from the motor pod plate;

the first right absorber end being pivotably mounted to the motor pod plate, adjacent to the motor pod plate;

the second right absorber end being pivotably mounted to the chassis, offset from the chassis;

the first right link end being pivotably mounted to the motor pod plate, adjacent to the first right absorber end;

the second right link end being pivotably mounted to the chassis, offset from the motor pod plate;

the first upper link end being pivotably mounted to the motor pod plate, adjacent to the motor pod plate;

the second upper link end being pivotably mounted to the chassis, offset from the motor pod plate;

the upper shock absorber being integrated along the upper pitch suspension link;

the lower pitch suspension link being positioned in between the motor pod plate and the chassis;

the first lower link end being pivotably mounted to the chassis, adjacent to the left yaw suspension link; and the second lower link end being pivotably mounted to the motor pod plate, adjacent to the right yaw suspension link.

13. The suspension system for radio control vehicles as claimed in claim 12 comprises:

an upper extension arm;

the upper extension arm comprises an upper fixed end and an upper free end;

the upper fixed end being mounted adjacent to the motor pod plate;

the upper free end being positioned adjacent to the chassis; and the first upper link end being pivotably mounted to the upper free end.

14. The suspension system for radio control vehicles as claimed in claim 12 comprises:

a lower extension arm;

the lower extension arm comprises a lower fixed end and a lower free end;

the lower fixed end being mounted adjacent to the chassis;

the lower free end is positioned in between the motor pod plate and the chassis; and the first lower link end being pivotably mounted to the lower free end.

* * * * *